Aug. 23, 1932.    R. L. OLSEN    1,873,464
AUTOMOTIVE DEMOUNTABLE WHEEL
Filed Nov. 30, 1923
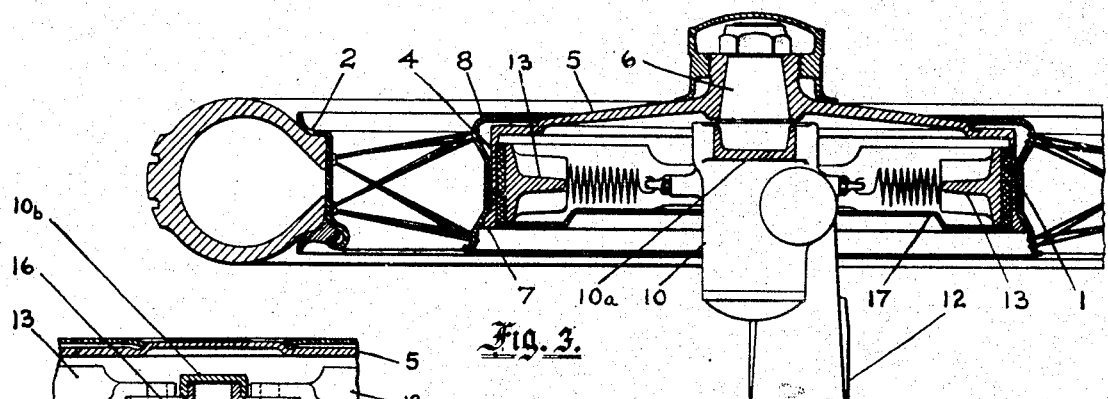
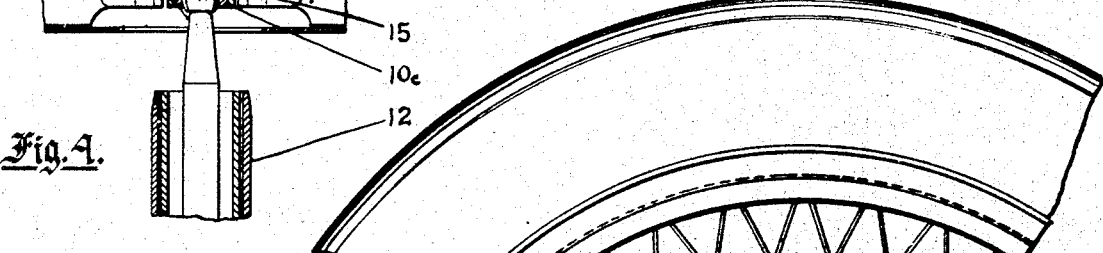
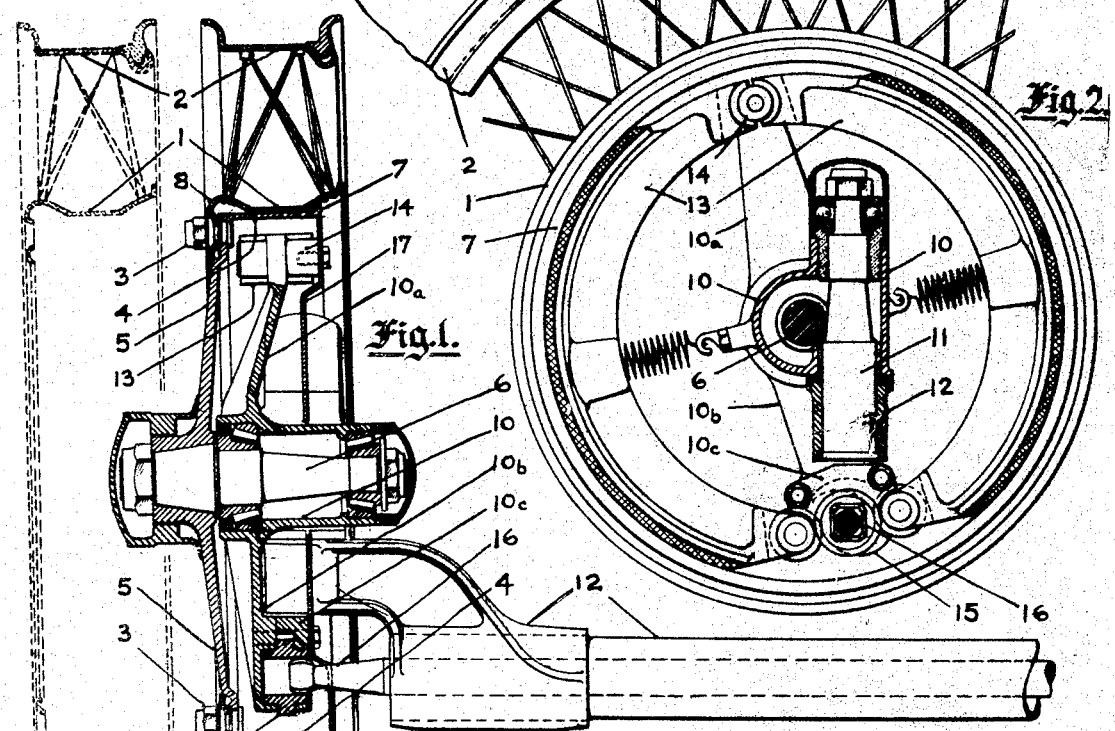

Patented Aug. 23, 1932

1,873,464

UNITED STATES PATENT OFFICE

ROLF LEHMANN OLSEN, OF JAMAICA, NEW YORK

AUTOMOTIVE DEMOUNTABLE WHEEL

Application filed November 30, 1923. Serial No. 677,822.

This invention relates to the construction of so-called demountable wheels for automobiles and consists in the combination of the several features hereinafter described which are adapted for use either on driving or steering wheels, but particularly the latter, the object being to bring the driving and braking forces into substantially the plane of the wheel tread, and, in the case of a steering wheel, to locate the steering axis also substantially in said plane, so as to produce a wheel mechanically well adapted to the conditions of service besides being compact and pleasing in appearance.
In the accompanying drawing Fig. 1 represents a central section of a front steering wheel embodying the principles of this invention in their preferred form. The body part of the wheel removed from the hub part is indicated in dotted lines in this figure.

Fig. 2 is a vertical section through the steering spindle, the other parts being in side elevation.

Fig. 3 is a horizontal section of the wheel part broken away.

Fig. 4 is a section through the brake-actuating cam.

The wheel is divided into a quickly removable body part and a hub part which is journalled on the axle. The separation or removability of the body from the hub is for the purpose of substitution of a spare body part as in the case of a tire failure. The body part comprises an inner ring or hub shell 1 to which the rim 2 is tied by means of spokes. The rim may be of any desired design. The hub shell 1 is adapted to be removably telescoped over and seated upon the hub part of the wheel and when in position thereon is fastened in place by means of the bolts or studs 3 engaging its flange. The hub part comprises a cylindrical wall 4 and a web 5, the latter having a taper-socketed hub keyed and bolted fast to the stub shaft 6, so that the latter revolves with the wheel. The seat for the hub shell is formed by the exterior cylindrical surface of the wall 4 and when the hub shell is in place thereon the said wall and the hub shell 1, as well as the wheel rim 2, all occupy the same common plane and are substantially centered thereon. When the nuts 3 are screwed home they force the inner flared end of the shell 1 against the thickened and coned edge 7 of the hub wall 4, which edge serves as the limit stop for the wheel body and likewise re-enforces the wall 4 against distortion. The sleeve portion of the hub shell 1, which seats on the wall 4, desirably overhangs the edge 7 and the inner row of spoke nipples is set in the overhanging portion. The other row of spoke nipples is set in the opposite end of the hub shell at which point the latter is provided with an annular bulge 8 in order that the heads of the nipples may have adequate clearance from the hub structure.

The stub shaft 6 is journalled in a pair of roller bearings mounted in a housing 10, which housing is mounted on the upright steering spindle 11 as indicated in Fig. 2, the spindle 11 being secured fast to the front axle 12. The design of these parts will be clear from the drawing, without description. The two roller bearings are respectively situated on opposite sides of the central plane of the wheel and the housing 10 is intersected by such plane while the steering spindle 11 is also substantially intersected thereby, being in any event close to said plane and within the hub structure.

The wall 4 of the hub part, besides serving as the seat for the removable wheel body, also serves as the brake drum. Its inner surface is cylindrical and adapted to be frictionally engaged by two or more internal expanding brake shoes 13 which are provided with the usual brake lining as indicated. These shoes are fulcrumed at their upper ends upon a common anchor stud 14 carried upon an upwardly extending arm 10$^a$ of the housing 10 and at their lower ends they are adapted to be spread apart by a floating cam 15 mounted in a socket in a lower arm 10$^b$ of said housing. The ends of the brake shoes are provided with anti-friction rollers for engagement by the cam. The latter is confined in its cylindrical socket in the arm 10$^b$ by means of a cap 10$^c$ and the interior of the cam is hollow and square or angular in section as indicated in Figure 2 and adapted to be loosely engaged and rotated by the correspondingly shaped end of the brake rock shaft 16, which latter is journalled on or in the front axle. Rotation of this shaft rocks the cam 15, thereby spreading the brake shoes against the brake drum 4 and inasmuch as the axis of the steering spindle passes through the cam and the cam actuating end of the brake shaft, the action of the latter on the brake shoes may be independent of and unaffected by the angular position of the plane of the wheel with reference to the front axle. The brake shoes are thus situated inside the wheel, intersected by the central plane therof and the frictional heat developed by them is provided with an adequate path of escape represented by the hub shell 1 and the spokes connected to the latter. The springs shown serve to contract the brake shoes.

A cover plate 17 is secured by screws to the brake arms 10$^a$ and 10$^b$ and serves to enclose and protect the brake mechanism. Hub and dust caps are also shown in their usual relations.

While the wheel above described is a steering wheel it will now be apparent that the same relative arrangement of wheel body and brake drum can also be applied to non-steering or driving wheels in an obvious way.

I claim:

1. In an automotive wheel, the combination of a hub part including a hub, web and brake drum, and a body part including a rim, and a hub shell having an annular flange overlapping said web adapted to be secured thereto by a series of bolts and a sleeve portion in the same plane as the rim adapted to telescope over and seat upon the exterior surface of the brake drum.

2. An automotive wheel comprising a center part and an outer part, the center part consisting of a brake drum having a hub fitted to a bearing member, a web and a cylindrical friction wall; the outer part consisting of a shell, spoking means and tire, said outer part telescoping over and seating upon the friction wall of the drum and having an in-bent securing flange overlapping the marginal region only of said center part.

3. An automotive wheel comprising a center part and an outer part, the center part including a web and friction wall; the outer part including a shell surrounding the friction wall and finding its entire bearing thereon and provided with securing means coacting with the marginal part of the web, a tire-rim and means wholly confined to the annular space between said rim and said friction wall for connecting said rim to the shell.

In testimony whereof, I have signed this specification.

ROLF LEHMANN OLSEN.